(12) United States Patent
Martel et al.

(10) Patent No.: US 12,210,345 B2
(45) Date of Patent: Jan. 28, 2025

(54) METHOD FOR MANEUVERING AND DOCKING AIRCRAFT PARKED PARALLEL TO AN AIRPORT TERMINAL STAND

(71) Applicant: Borealis Technical Limited, North Plains, OR (US)

(72) Inventors: Thomas O. Martel, Newman, GA (US); Isaiah W. Cox, London (GB); Joseph J. Cox, Portland, OR (US)

(73) Assignee: WheelTug, plc, Isle of Man (IM)

( * ) Notice: Subject to any disclaimer, the term of this patent is extended or adjusted under 35 U.S.C. 154(b) by 609 days.

(21) Appl. No.: 17/561,590

(22) Filed: Dec. 23, 2021

(65) Prior Publication Data

US 2022/0206495 A1    Jun. 30, 2022

Related U.S. Application Data

(60) Provisional application No. 63/131,671, filed on Dec. 29, 2020.

(51) Int. Cl.
   *G05D 1/00*    (2024.01)
   *B64C 25/32*   (2006.01)
   *B64F 1/305*   (2006.01)

(52) U.S. Cl.
   CPC ......... *G05D 1/0202* (2013.01); *B64C 25/405* (2013.01); *B64F 1/305* (2013.01)

(58) Field of Classification Search
   CPC .. B64F 1/002; B64F 1/305; B64F 1/00; B64F 1/315; G08G 5/065; G08G 5/0026;
   (Continued)

(56) References Cited

U.S. PATENT DOCUMENTS

| 6,772,464 B2 * | 8/2004 | Hutton | B64F 1/002 700/13 |
| 7,596,825 B2 * | 10/2009 | Anderberg | B64F 1/3055 14/71.5 |

(Continued)

FOREIGN PATENT DOCUMENTS

| GB | 2524158 A1 | 9/2015 |
| GB | 2535440 A1 | 2/2016 |

OTHER PUBLICATIONS

Groot, Marnix; A History of the Boarding Bridge—Part 1 (Jul. 2, 19, 2019); https://www.airporthistory.org/boarding-bridge-1.html.

*Primary Examiner* — Redhwan K Mawari

(57) ABSTRACT

A method is provided that reduces time to dock an electric taxi drive system-driven aircraft parking in a parallel orientation at an airport terminal. Passenger loading bridges are pre-positioned to substantially align with forward and rear doors of the aircraft. Pre-positioned passenger loading bridges extend from the terminal to locations that align with terminal-facing forward and rear doors when electric taxi systems maneuver the aircraft into the parallel parking orientation. The passenger loading bridge connected to a rear door may be pre-positioned at a height above the ramp surface above or below the height of the aircraft's horizontal stabilizer or below the height of the wing to enhance safety and further reduce connection and passenger transfer time. Connection of the pre-positioned passenger loading bridges with the aircraft doors should require only minimal adjustment before passenger transfer between the aircraft and terminal may begin.

15 Claims, 4 Drawing Sheets

(58) Field of Classification Search
CPC ....... Y02T 50/80; E01D 15/005; E01D 15/24; G01S 17/42; G01S 7/4802; G05D 1/0083
See application file for complete search history.

(56) References Cited

U.S. PATENT DOCUMENTS

| | | | |
|---|---|---|---|
| 9,623,986 B2 | 4/2017 | Cox et al. | |
| 9,771,148 B2* | 9/2017 | Cox | B64C 25/405 |
| 10,308,352 B2* | 6/2019 | Cookman | B64C 25/405 |
| 10,519,614 B2* | 12/2019 | Glatfelter | B64F 1/3055 |
| 11,735,059 B2* | 8/2023 | Cox | B64D 43/00 |
| | | | 701/3 |
| 2005/0253020 A1* | 11/2005 | McCoskey | B64F 1/31 |
| | | | 244/137.1 |
| 2006/0163432 A1* | 7/2006 | McCoskey | B64F 1/31 |
| | | | 244/137.1 |
| 2007/0007389 A1* | 1/2007 | McCoskey | B64F 1/31 |
| | | | 244/118.5 |
| 2007/0040063 A1* | 2/2007 | McCoskey | B64F 1/35 |
| | | | 244/114 R |
| 2015/0076280 A1* | 3/2015 | Cox | B64D 9/00 |
| | | | 244/50 |
| 2019/0344906 A1* | 11/2019 | Hakansson | B64F 1/002 |
| 2022/0242556 A1* | 8/2022 | Cox | B64C 25/405 |

* cited by examiner

Taxi In

Twist In

Safety Zone
−21ft. from tail (de)Board

Twist Out

Taxi Out

METHOD FOR MANEUVERING AND DOCKING AIRCRAFT PARKED PARALLEL TO AN AIRPORT TERMINAL STAND

TECHNICAL FIELD

The present invention relates generally to methods for maneuvering and docking aircraft to parking stands at airport terminals and specifically to a method that maneuvers aircraft powered by electric taxi drive systems into a parking orientation with the longest axis of the aircraft parallel to an airport terminal stand and connects passenger loading bridges to aircraft front and rear doors.

BACKGROUND OF THE INVENTION

Maneuvering and docking aircraft to park at apron or ramp stands adjacent to airport terminals has evolved over many decades to accommodate, among other things, changes in aircraft and aircraft engine designs and sizes, changes in airport terminal configurations, increased numbers of passengers, and structures used to transfer passengers between airport terminals and aircraft interiors. Passenger loading or boarding bridges have also evolved from simple canopies that provided a protective walkway for passengers traversing the distance between the terminal and an aircraft to the currently available variations of extendible and retractable enclosed comfort conditioned spaces connecting aircraft and terminals. Positions and numbers of aircraft doors used for passenger boarding and deboarding have additionally changed as aircraft body design and the kinds of engines powering aircraft flight have changed, as has the parking orientation of aircraft to airport terminals. Currently, aircraft are typically driven into ramp stands or gates with at least one operating main engine to park in a nose-in orientation with a longest axis of the aircraft substantially perpendicular to the terminal. In some cases, aircraft may be towed into stands with tow vehicles. Hazard zones associated with engine ingestion and jet blast that accompany operating main engines may be more clearly identified when aircraft are parked in the nose-in orientation, and ground service personnel and equipment may avoid the marked hazard zones. A passenger loading bridge may be extended to provide a connection between a forward door or possibly a rear door of the parked aircraft and the terminal, enabling passengers on an arriving aircraft to leave the aircraft and enter the terminal using the loading bridge. Passengers on a departing aircraft leave the terminal and enter the aircraft using the loading bridge. Passenger loading bridges may be kept fully or partially retracted toward the terminal and out of the ramp area until needed to maximize space available for aircraft and ground service equipment maneuvering within the area. The passenger loading bridge at a stand assigned to an arriving aircraft may not be extended to connect with an aircraft door until the aircraft has arrived at the stand. Depending on the length of the passenger loading bridge and the assigned parking location of the aircraft, this could take some time.

Applicant and others have proposed driving aircraft on the ground with landing gear wheel-mounted non-engine drive motors and/or electric taxi drive systems that do not rely on power from aircraft main engines and movement by tow vehicles. Applicant has additionally proposed maneuvering aircraft with the landing gear wheel-mounted drive motors and electric taxi systems to park in terminal parking locations with the longest axis of the aircraft oriented parallel to the terminal and the simultaneous connection of multiple parallel passenger loading bridges to at least a forward aircraft door and a rear aircraft door. The identification of engine-related hazard zones is not required, and aircraft may be maneuvered with the drive motors or electric taxi systems to park parallel to the terminal without the hazards that accompany operating aircraft main engines. As soon as the aircraft is stopped at a stand, passengers may be transferred between the aircraft and the terminal and between the terminal and the aircraft through the multiple passenger loading bridges to simultaneously deboard and board using both forward and rear aircraft doors. This process may significantly improve the efficiency of and decrease time required for passenger transfer. The time required for the passenger loading bridges to be extended or retracted to connect with aircraft forward and rear doors may, for aircraft parked in parallel parking orientations at parking locations in some airport ramp areas, be longer than desirable.

A method that reduces this time requirement so that passenger loading bridge connections and disconnections to aircraft forward and rear doors may be established more quickly and passenger transfer may be conducted in less time than has heretofore been possible is needed for aircraft driven into parallel parking orientations with electric taxi and other non-engine drive systems without reliance on tow vehicles and operation of aircraft main engines.

SUMMARY OF THE INVENTION

The present invention provides a method that reduces the time required to maneuver and dock an electric taxi drive system-driven aircraft in a parallel orientation to an airport terminal when passenger loading bridges are at least partially extended from the airport terminal and pre-positioned in locations that substantially align with at least a forward and a rear door on a terminal-facing side of the aircraft so that the passenger loading bridges may be fully extended and the aircraft may dock and establish passenger transfer connections between the forward and rear doors and the airport terminal as soon as the aircraft is maneuvered with the electric taxi drive systems to park in the parallel orientation.

Another object of the present invention provides a method that reduces time for passenger transfer when passenger loading bridges are pre-positioned in stand parking locations that substantially align with forward and rear doors of the type of aircraft driven by the electric taxi drive systems to park in the parallel orientation so that only minor adjustments are needed to fully connect the passenger loading bridges to the aircraft doors before passenger transfer may commence.

An additional object of the present invention is to provide a method for reducing time for passenger transfer that pre-positions a passenger loading bridge to substantially align with a rear door location of an aircraft driven by an electric taxi drive system parking parallel to a terminal with the passenger loading bridge pre-positioned at a height above the ramp surface that is above or below the height of the aircraft's horizontal stabilizer so that the passenger loading bridge may be pre-positioned at the rear door location for the parked aircraft and the aircraft may avoid contact with the horizontal stabilizer as the aircraft is maneuvered into the parallel parking location, and the passenger loading bridge may require primarily vertical adjustments to connect to a rear aircraft door.

A further object of the present invention provides a method for reducing time for passenger transfer when a passenger loading bridge is pre-positioned at a height above the ramp surface that is below the height of both the aircraft wing and the aircraft horizontal stabilizer to substantially align with at least a rear door of aircraft driven by electric taxi drive systems to park parallel to a stand or terminal so that only vertical movement of the pre-positioned passenger loading bridge is required to fully connect with the aircraft door and begin passenger transfer.

Yet a further object of the present invention is to provide a method that reduces aircraft turnaround when, prior to arrival at an airport terminal stand, passenger loading bridges are laterally extended from the airport terminal and pre-positioned in locations that substantially align with locations of aircraft forward and rear doors at heights above the ramp surface that avoid contact with aircraft wings and tails as aircraft are maneuvered by electric taxi drive systems into a parallel parking orientation, and the pre-positioned passenger loading bridges require only minor primarily vertical adjustment to dock with aircraft forward and rear doors prior to commencing passenger deboarding and boarding.

In accordance with the aforesaid objects, the present invention provides a method that reduces the time to dock an electric taxi drive system-driven aircraft when passenger loading bridges are pre-positioned to connect quickly to forward and rear doors of electric taxi system-driven aircraft parking in a parallel orientation at an airport terminal stand. Extendible passenger loading bridges may be partially or fully extended from the terminal and pre-positioned in locations that substantially align with forward and rear doors on a terminal-facing side of the aircraft when electric taxi systems maneuver the aircraft into the parallel parking orientation. The passenger loading bridge to be connected to a rear door may be pre-positioned at a height above the ramp surface that is above or below the height of the aircraft's horizontal stabilizer or below the height of the wing to further reduce docking and connection time. Connection of the pre-positioned passenger loading bridges with the aircraft doors should require only minimal adjustment, and passenger transfer between the aircraft and airport terminal may commence more quickly than is currently possible.

In one embodiment, the passenger loading bridges are extended and pre-positioned in locations that substantially align with a forward door and a rear door on a terminal-facing side of the aircraft when the aircraft is maneuvered into the stand with the electric taxi drive systems to park in the parallel orientation. Only minor or minimal adjustments should be required for the passenger loading bridges to connect to the aircraft doors. Stands at airports where electric taxi drive system-driven aircraft are able to park in the parallel orientation will be equipped with at least two extendible passenger loading bridges for each aircraft to provide passenger transfer connections between the airport terminal and at least a front door and a rear door on the terminal-facing side of the parallel parked aircraft. Relative locational spacing and distances between front and rear doors can be determined for the type of aircraft parking in the parallel orientation at an assigned terminal parking location. An optimal distance from the terminal to the terminal-facing side and doors of an aircraft parked in the parallel orientation will also be determined for the type of aircraft. Before the aircraft arrives at its assigned parallel parking location, the passenger loading bridges are extended laterally outwardly from the terminal for a distance that locates the docking or aircraft connection end of each passenger loading bridge at a location that substantially aligns with a location of at least one front and one rear aircraft door.

At least the passenger loading bridge to be connected to a rear passenger door is maintained at a vertical distance or height above the ramp ground surface that will avoid contact with the aircraft's horizontal stabilizer and wing. The passenger loading bridge may be vertically positioned above or below the height of the aircraft's horizontal stabilizer or below the height of the aircraft's wing, depending on the configurations of the passenger loading bridge, the aircraft, and the terminal parking location. The electric taxi drive system-driven aircraft may be maneuvered into the assigned parking location with the aircraft longest axis parallel to the terminal to park as close as possible to the aircraft connection ends of the pre-positioned passenger loading bridges and with the front and rear aircraft doors substantially aligned with aircraft connection ends of the passenger loading bridges. Each of the passenger loading bridges may then be moved vertically and/or in other directions as required to directly connect the aircraft connection end to a front aircraft door and to a rear aircraft door to provide passenger transfer access between the aircraft and the terminal. When passenger transfer out of and into the aircraft is completed, the passenger loading bridges are undocked from the aircraft, if necessary, lowered to a height that will avoid contact with the aircraft wing and horizontal stabilizer, and then retracted away from the aircraft so that aircraft can maneuver with the electric taxi drive systems away from the stand and out of the ramp.

Additional objects and advantages will be apparent from the following description, claims, and drawings.

DESCRIPTION OF THE INVENTION

Figure 1A:
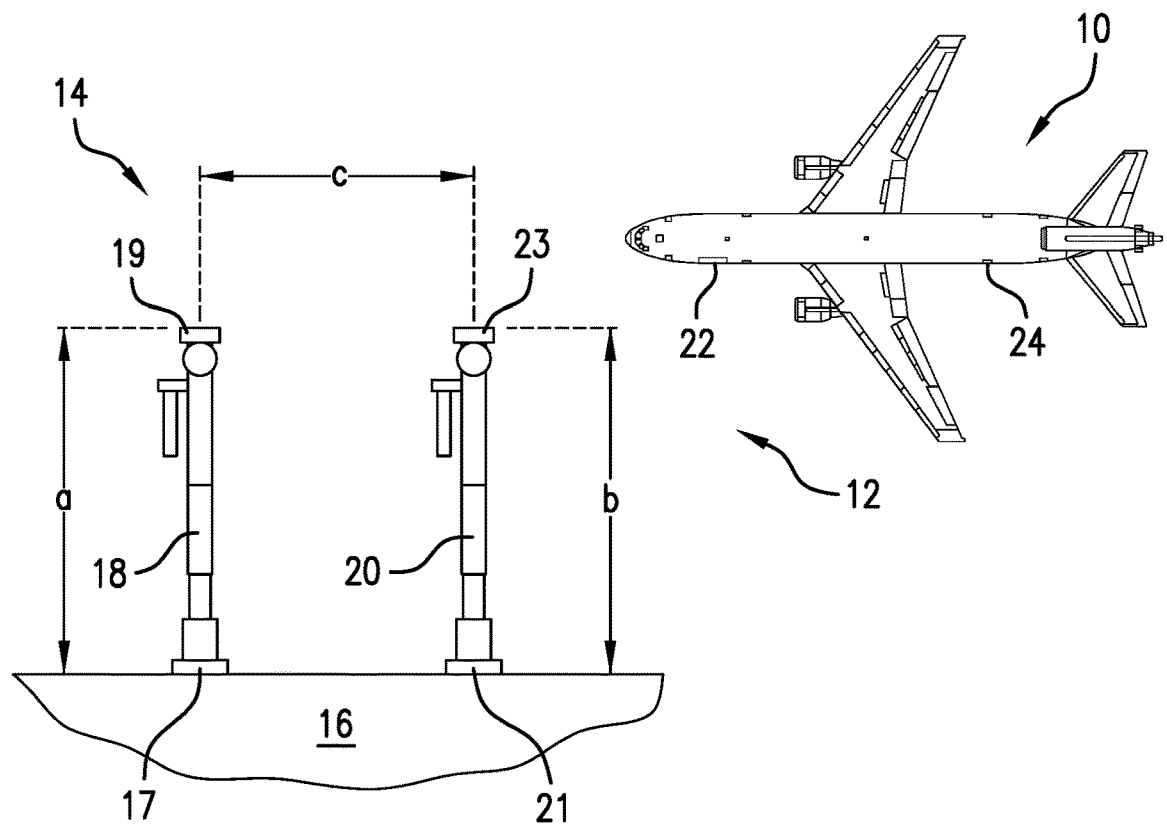
FIG. 1A is a schematic plan view of an airport terminal stand parking location with extendible passenger loading bridges pre-positioned in locations that will be in substantial alignment with the aircraft front and rear doors of an electric taxi drive system-driven aircraft approaching the parking location to enable connections of the loading bridges with minimal adjustment to a front door and to a rear door of an aircraft maneuvered with electric taxi drive systems into the parking location to park in the parallel orientation with the aircraft longest axis parallel to the terminal.

The time required to extend passenger loading bridges, to move them toward a parked aircraft, and then align them with even one aircraft door may add to the total time the aircraft spends on the ground. An aircraft may be maneuvered to park in an orientation parallel to a terminal so that both front and rear aircraft doors may be connected to passenger loading bridges, and passengers may be deboarded more efficiently once the passenger loading bridges are actually connected. However, the time that could be required to extend both bridges and to properly align them so a passenger transfer connection may be made between the aircraft and the terminal may reduce this efficiency. The method of the present invention reduces time required to make a passenger transfer connection between the aircraft and terminal when the aircraft are driven and maneuvered with electric taxi drive systems to park at the terminal and dock with one or more passenger loading bridges. When, in accordance with the present invention, the passenger loading bridges are pre-positioned to substantially align with at least a rear door and a front door on the aircraft before the aircraft reaches its assigned terminal parking location, the maneuvering required to move the passenger loading bridges into a position that enables connection with an aircraft door may be minimal, and docking may be achieved quickly with only minor adjustments. The wait for passenger loading bridges to be extended from the terminal may be eliminated, and passenger transfer may begin more quickly after the aircraft arrives at its assigned parking location than is currently possible.

The terms "airport terminal" and "terminal" used herein include an airport terminal building and like structures, whether or not attached to a terminal building. The terms "parking location," "gate," and "stand" all are used to refer to places or locations where aircraft are parked at or near an airport terminal for passenger transfer after arrival and before departure. The terms "ramp" and "ramp area" will be used herein to refer to the area at an airport that is intended to accommodate aircraft for the loading and unloading of passengers, mail, cargo, fueling, parking, or maintenance. The term "ramp" is synonymous with the term "apron," which is also used to identify this area at an airport.

The terms "loading bridge" and "passenger loading bridge," as used herein, refer to structures attached to an airport terminal used to transfer passengers between the terminal and aircraft and is contemplated to include known types of loading bridges, which may be fixed to the terminal and are extendible to reach the aircraft for passenger transfer and are retractable away from the aircraft toward the terminal when passenger transfer is complete. Passenger loading bridges typically provide an enclosed connection passageway between the airport terminal and an aircraft for passenger transfer during the deboarding and boarding processes. Passenger loading bridges that are "substantially aligned" with aircraft doors as described herein are pre-positioned or positioned with an aircraft attachment end that is roughly aligned with an aircraft door opening and may then be adjusted to be fully aligned with and connected to the aircraft door to provide a passenger transfer connection.

"Electric taxi drive systems," "drive systems," and "electric taxi systems" refer to pilot-controllable landing gear wheel-mounted drive systems used to drive aircraft independently of and without reliance on operation of aircraft main engines and tugs or external tow vehicles. Electric taxi drive systems may include landing gear wheel-mounted electric drive motors, gear or roller traction drive systems, clutches, and other components activatable to power landing gear wheels and drive the aircraft during ground travel in response to pilot control. An example of one type of an electric taxi drive system developed by Applicant to drive an aircraft during ground travel without reliance on operation of the aircraft's main engines and attachment to tugs is described in commonly owned U.S. Pat. No. 10,308,352, the disclosure of which is fully incorporated herein in its entirety by reference. Other drive systems using drive motors that are not electric, including, for example, hydraulic or pneumatic drive motors, may also drive aircraft in connection with the automatic aircraft parking system and method of the present invention and are contemplated to be included within the terms "electric taxi drive systems" and "drive systems." An electric taxi drive system may be mounted completely within a volume defined by wall sections of a landing gear wheel in one or more nose or main landing gear wheels. In a preferred embodiment, electric taxi drive systems are mounted completely within defined wheel wall section volumes in both nose landing gear wheels and are controlled by a pilot or flight crew from the aircraft cockpit with controls designed to operate the electric taxi drive system, power the nose landing gear wheels, and drive the aircraft during ground travel without reliance on the aircraft's main engines and external assistance from tugs.

Figure 1B:
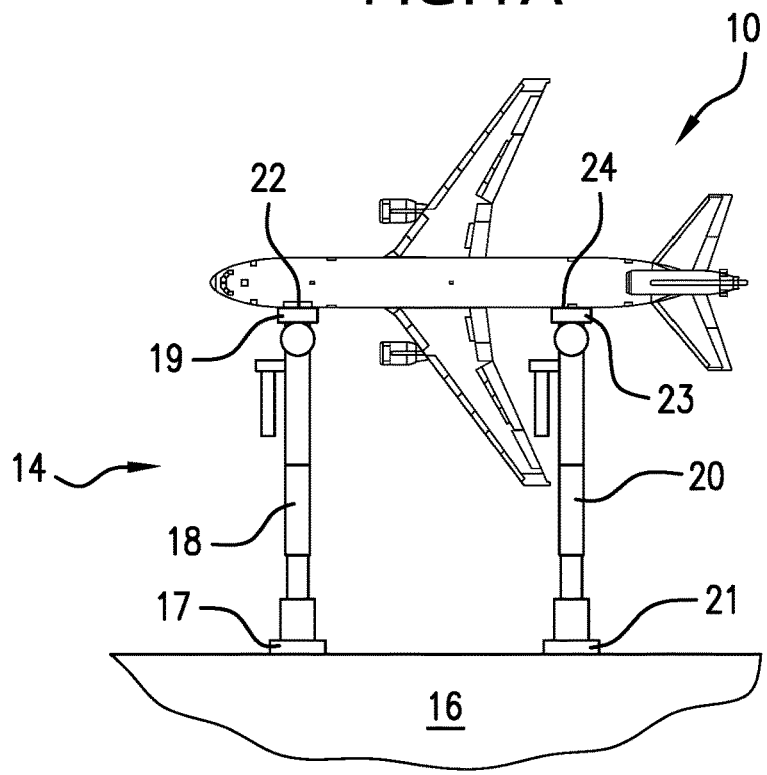
FIG. 1B illustrates the aircraft maneuvered with electric taxi drive systems to dock at the airport terminal stand parking location of FIG. 1A, showing the pre-positioned passenger loading bridges aligned with and connected to the aircraft front and rear doors so that passenger transfer between the aircraft and the terminal may commence.

Referring to the drawings, which are not drawn to scale, FIGS. 1A and 1B show, respectively, a schematic plan view of an electric taxi drive system-driven aircraft 10 being maneuvered with the electric taxi drive systems within an airport ramp area 12 toward a stand or parking location 14 at an airport terminal 16. Two passenger loading bridges 18 and 20 that are of the extendible and retractable type of passenger loading bridge are shown in an extended position with terminal connection ends 17 and 21 attached to the terminal 16. The passenger loading bridges 18 and 20 are shown extended outwardly of the terminal awaiting the docking of the aircraft 10. Each of the loading bridges 18 and 20 has been pre-positioned with a respective aircraft connection end 19 and 23 in a location that will enable substantial alignment of the aircraft connection end of a passenger loading bridge with at least a front door 22 and a rear door 24 on the aircraft 10. The passenger loading bridges 18 and 20 are ideally pre-positioned so that the aircraft connection ends 19 and 23 are located respective distances a and b away from the terminal 16. The respective distances a and b may be determined prior to pre-positioning the passenger loading bridges by considerations that may include the configuration of the stand and/or the terminal, locations of adjacent stands and passenger loading bridges, and the type of aircraft to be docked at the parking location. The distance c between the passenger loading bridges may be determined prior to pre-positioning by considerations including the type of aircraft and the distance between the aircraft forward and rear doors to be connected to the aircraft connection ends 19 and 23 of the passenger loading bridges 18 and 20.

FIG. 1B shows the aircraft 10 after the aircraft has been maneuvered with the electric taxi drive systems into the parking location 14, the pre-positioned passenger loading bridges 18 and 20 have been adjusted to completely align with the aircraft doors 22 and 24, and the aircraft connection ends 19 and 23 of the loading bridges have been connected with the aircraft doors 22 and 24. The aircraft is fully docked, and passenger transfer may commence.

FIGS. 1A and 1B show the aircraft 10 moving toward the parking location 14 in a forward direction along a path with the longitudinal axis of the aircraft oriented parallel to the terminal building 16. The passenger loading bridges 18 and 20 are also shown extending parallel to each other and perpendicular to the terminal 16 and the aircraft 10.

Figure 2:
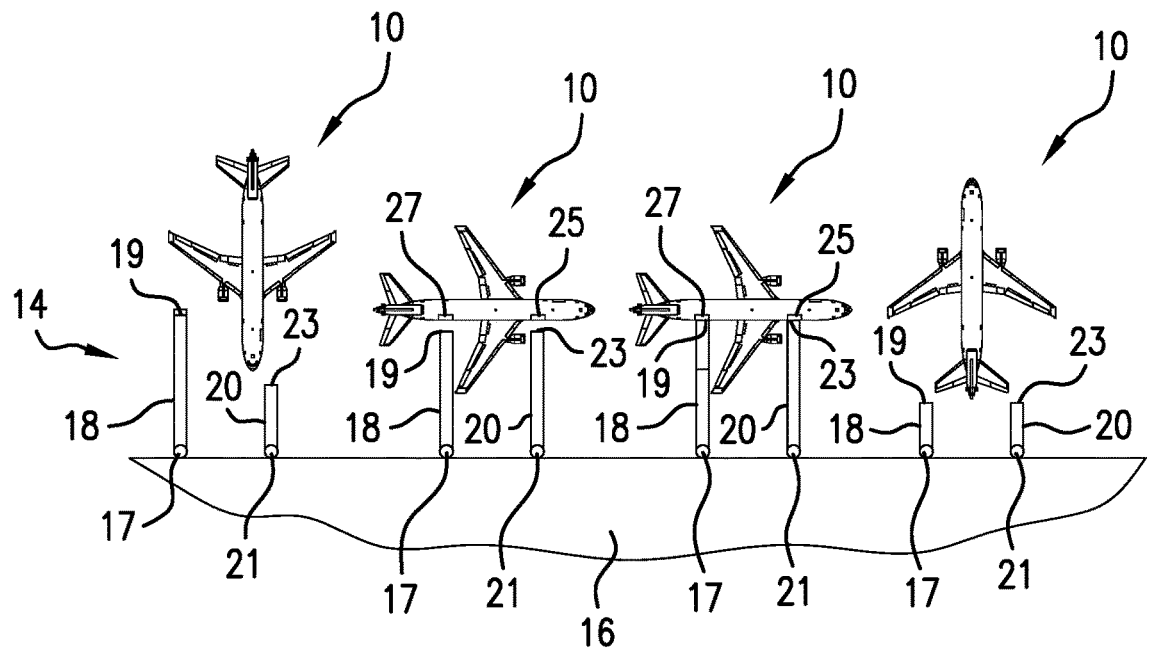
FIG. 2 is a schematic illustration of one way in which an aircraft driven by electric taxi drive systems may approach the pre-positioned loading bridges at a terminal stand in a nose-in orientation and may then be maneuvered by the electric taxi drive systems to turn adjacent to the pre-positioned passenger loading bridges to a parallel orientation and to substantially align with the passenger loading bridges, which are then adjusted as required to connect with the aircraft front and rear doors for passenger transfer, after which the passenger loading bridges are retracted, and the aircraft is maneuvered with the electric taxi drive systems from a parallel to a nose-out orientation and driven out of the stand with the electric taxi drive systems.

FIG. 2 shows in more detail a series of steps of the present method in which the aircraft 10 approaches the terminal parking location 14, the passenger loading bridges are pre-positioned and initially adjusted, the aircraft turns to a parallel parking orientation, the passenger loading bridges are further adjusted to connect directly to each aircraft door, and passenger transfer can take place. After passenger transfer is completed, the passenger loading bridges may be partially or fully retracted, and the aircraft turns and is maneuvered with the electric taxi drive systems out of the parking location. The direction of approach of the aircraft 10 to the parking location or stand 14 is different from that shown in FIGS. 1A and 1B. The aircraft approach direction in FIGS. 1A and 1B is from the right, while the aircraft approach direction in FIG. 2 is from the left. Aircraft forward door 25 and rear door 27 on an opposite side of the aircraft from forward door 22 and rear door 24, shown in FIGS. 1A and 1B, will dock with respective passenger loading bridges 20 and 18. Whether an aircraft to be docked in the parallel orientation shown approaches the stand from the right or the left may depend on terminal and stand arrangements at specific airports. The method of the present invention provides the flexibility for aircraft to park in the parallel orientation from both approaches.

Viewing the steps from left to right in FIG. 2, in the leftmost image the aircraft 10 is approaching the parking location 14. The passenger loading bridge 18 to be connected to the aircraft rear door 27 may be almost fully extended and pre-positioned so that the aircraft connection end 19 requires only minor or minimal adjustment when aligned with the aircraft rear door 27. The passenger loading bridge 20 to be connected to the aircraft front door 25 may be only partially extended and pre-positioned with the aircraft connection end 23 a shorter distance from the terminal 16 than that of the passenger loading bridge 18. This may ensure that the aircraft 10 has sufficient space to be safely turned from the nose-in ground travel orientation shown at the left to the parallel parking orientation. After the aircraft is turned with the electric taxi drive systems to the parallel parking orientation, the loading bridge 20 may be fully extended to the pre-position distance of the loading bridge 18. When a passenger loading bridge may be pre-positioned to be almost fully extended toward the aircraft as it is maneuvered into a parking location, less time will be required to fully connect the passenger loading bridge to the aircraft door than when a passenger loading bridge may be pre-positioned in a partially extended condition. Passenger transfer may be delayed somewhat, but should still begin more quickly than is possible at present.

Maneuvering the aircraft 10 with electric taxi drive systems enables maneuvering of the aircraft very close to the aircraft connection ends 19 and 23 of the passenger loading bridges 18 and 20. When the aircraft connection ends 19 and 23 are in substantial alignment with the aircraft rear and front doors 27 and 25, only minor or minimal adjustments should be needed to fully connect the loading bridges to the doors. As discussed in detail below, pre-positioning a passenger loading bridge to connect to an aircraft rear door may require more vertical adjustment than with a passenger loading bridge to be connected to a front aircraft door.

When passenger transfer is complete, the passenger loading bridges 18 and 20 are disconnected from the aircraft and may be retracted partially or completely away from the aircraft toward the terminal. As shown in the rightmost image in FIG. 2, the aircraft is maneuvered with the electric taxi drive systems to turn from its parallel parking orientation to a nose-out orientation perpendicular to the terminal 16 and then drive out of the ramp area.

While foregoing arrangement may work well to provide simultaneous passenger transfer connections between aircraft front and rear doors 27 and 25 and the terminal 16, additional ways to maneuver an aircraft with electric taxi drive systems and park in an orientation with the aircraft longitudinal axis parallel to the terminal and connect to pre-positioned passenger loading bridges are possible. These are discussed below and described in connection with FIGS. 4A-4F.

Pre-positioning a passenger loading bridge to facilitate connection with an aircraft rear door may involve different considerations than pre-positioning a passenger loading bridge to connect with a front aircraft door. The rear section of the aircraft where one or more rear doors may be located is between the wings and the tail section horizontal stabilizers. The front section where one or more front doors may be located is forward of the wings and free from the potential obstructions posed by the wings and horizontal stabilizers when passenger loading bridges are extended toward an aircraft to pre-position them as described herein. After a passenger loading bridge has been laterally extended to a distance from the terminal that pre-positions the aircraft connection end at a location that may require only minor adjustments to fully align the loading bridge with the rear door, the aircraft must be maneuvered with the electric taxi drive systems into a parallel parking location that will enable connection with the pre-positioned loading bridge and the rear door and that will also permit connection of another passenger boarding bridge to a front aircraft door. In accordance with the present invention, a passenger loading bridge to be connected with a rear aircraft door may be pre-positioned so that it will be toward the aircraft tail end when the aircraft is maneuvered into the parallel parking orientation and it will be at a height that may be above or below the height of the aircraft's horizontal stabilizer.

Figure 3:
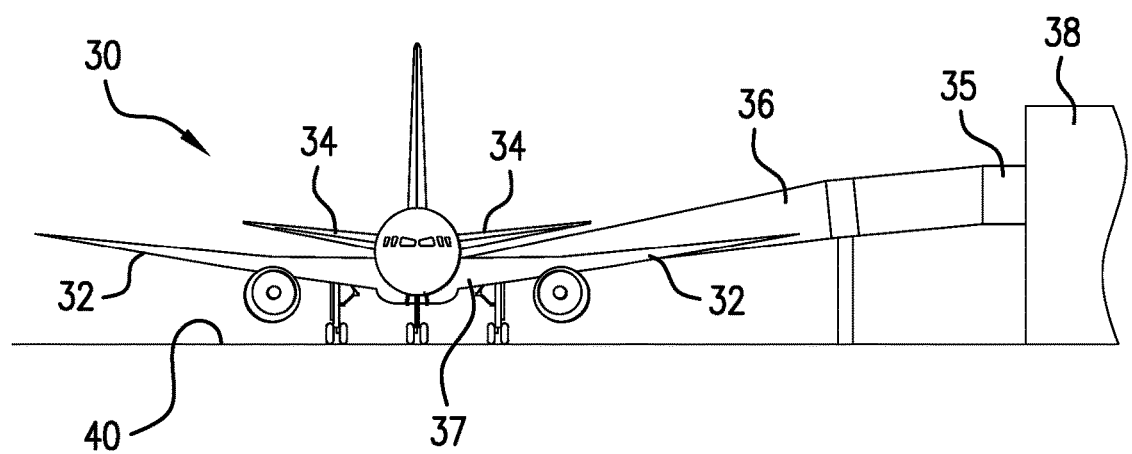
FIG. 3 is a view of the front nose end of an electric taxi drive system-driven aircraft illustrating the relative heights above the ramp area ground surface of a passenger loading bridge to be connected to a rear door of the aircraft, the aircraft's horizontal stabilizer, and the aircraft's wing so that the passenger loading bridge may be extended at a height that will enable the aircraft to be maneuvered with the electric taxi drive systems to safely dock and connect the rear door with a pre-positioned passenger loading bridge while avoiding contact with the horizontal stabilizer and the wing.

FIG. 3 shows the relative heights of a terminal-facing wing 32 and horizontal stabilizer 34 on an aircraft 30 and a partially extended passenger loading bridge 36 attached at a terminal connection end 35 to a terminal 38. Aircraft doors are generally located at heights above a ramp surface that are above the height of the wing 32 and may be located at heights that are close to the height of the horizontal stabilizer 34. The loading bridge 36 may be pre-positioned at a height above the ramp surface that is above or below the height of the horizontal stabilizer 34. Pre-positioning the loading bridge 36 at one of these heights will enable the aircraft 30 to turn safely from the nose-in ground travel orientation to the parallel parking orientation, as shown in FIG. 2 without striking the passenger loading bridge. When the aircraft 30 is in the orientation parallel to the terminal 38, as shown in FIG. 3, the passenger loading bridge 36, which may be pre-positioned closer to the aircraft 30 than shown, may then be raised vertically to completely align with and connect to the aircraft rear door.

Passenger loading bridges that can be pre-positioned as described may require adaptation to be lowered to the height above or below that of the horizontal stabilizer so the aircraft can clear the loading bridge as it turns. At many airport terminals, the terminal connection of passenger loading bridges is at a height above the ramp surface that may be higher than the height of the aircraft doors. Passenger loading bridges may be cantilevered to connect with the lower height aircraft doors. It is contemplated that passenger loading bridges useful with the present invention may be adapted so that they may be cantilevered to lower the aircraft connection end to a height below that of at least an aircraft horizontal stabilizer and, preferably, to a height below that of the aircraft wing. The horizontal stabilizer and wing heights referred to herein may vary for different types of aircraft, and it is contemplated that this information may be stored and made available for the manual and automatic operation of passenger loading bridges to extend them and make the requisite connections to aircraft doors, particularly rear doors. An additional adaptation that may be made to a passenger loading bridge suitable for use with the present method is to enable the loading bridge to be lowered to a height lower than that of the aircraft wing, by cantilevering or otherwise. Pre-positioning a passenger loading bridge at a height below that of both the horizontal stabilizer and the wing may enable the aircraft to be maneuvered with the electric taxi drive system with even more improved safety. Lowering the passenger loading bridge to a height lower than the aircraft wing should facilitate avoiding contact between the passenger loading bridge and the wing while maneuvering and docking the aircraft. A passenger loading bridge that is lower than the wing height may require a greater vertical adjustment than a passenger loading bridge that is not lower than the wing height, but this is likely to produce a minimal increase in docking time. When the passenger loading bridge can fit under the aircraft wing, the possibility of striking the passenger loading bridge with both the wing and the horizontal stabilizer is eliminated, and the aircraft may be maneuvered with less time and positioned closer to the pre-positioned passenger loading bridge than would otherwise be possible.

Pre-positioning a passenger loading bridge for connection to a front aircraft door is a simpler process than pre-positioning a passenger loading bridge for connection to a rear aircraft door due to the shape of the front of the aircraft and the absence of aircraft structures that must be maneuvered around. Passenger loading bridges to be connected to aircraft front doors, such as loading bridge 18 in FIGS. 1A and 1B and loading bridge 20 in FIG. 2, may be at a different height above the ramp surface than the passenger loading bridges to be connected to rear aircraft doors. Aircraft wing height may be a possible consideration in pre-positioning passenger loading bridges to be connected to front aircraft doors; this may depend on a particular aircraft's turning path, however.

Figure 4A:
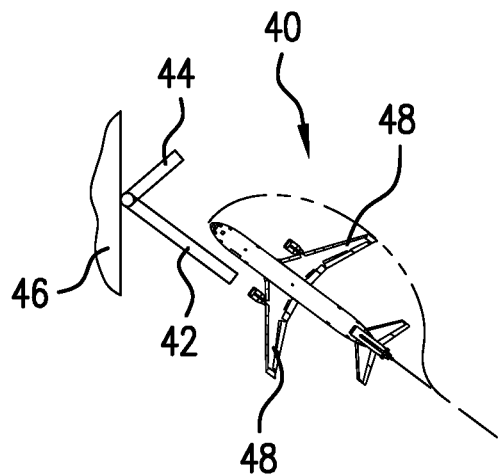
FIGS. 4A-4F illustrate another embodiment of the present method showing an aircraft maneuvered with electric taxi drive systems from a nose-in ground travel orientation into a parallel parking orientation to dock with one passenger loading bridge pre-positioned to substantially align with and connect to an aircraft rear door with only minimal adjustment after the electric taxi drive systems maneuvers the aircraft to turn from the nose-in orientation to the parallel orientation, another passenger loading bridge extended and connected with an aircraft front door, the aircraft undocked from both passenger loading bridges after passenger transfer is complete, and the aircraft maneuvered with the electric taxi drive systems from the parallel to a nose-out orientation to taxi out of the ramp.
Figure 4B:
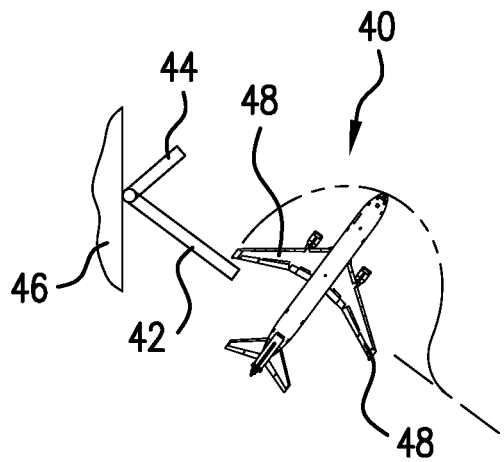
Figure 4C:
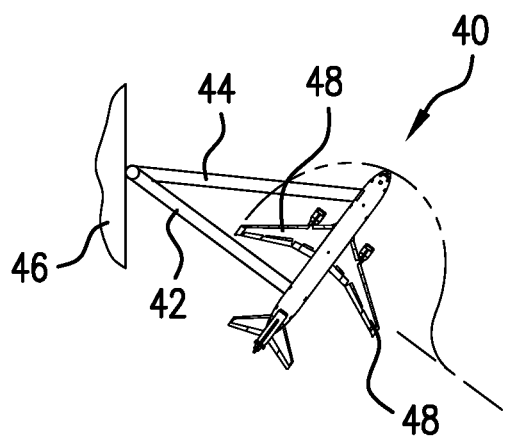
Figure 4D:
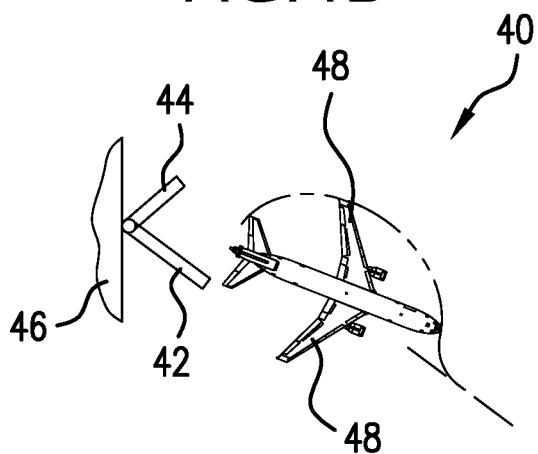
Figure 4E:
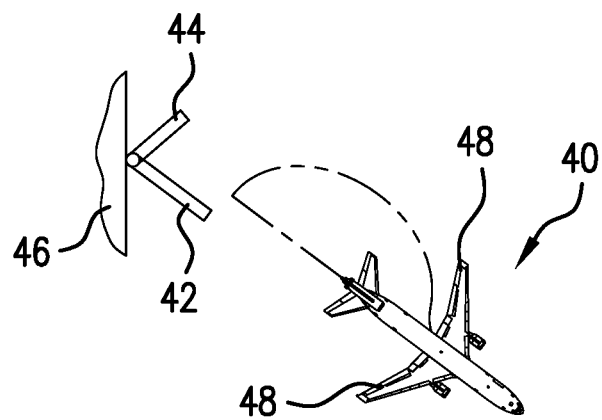

FIGS. 4A-4F illustrate another embodiment of the present method showing the maneuvering of an aircraft 40 with electric taxi drive systems from a nose-in ground travel orientation into a parallel parking orientation to dock with one passenger loading bridge 42 pre-positioned to substantially align with and connect to an aircraft rear door after vertical adjustment and minimal other adjustment after the aircraft has been maneuvered with the electric taxi drive systems to turn from the nose-in orientation to the parallel orientation, extending and connecting another passenger loading bridge 44 that has not been fully extended and pre-positioned with an aircraft front door, undocking the aircraft from both passenger loading bridges after passenger transfer is complete, and maneuvering the aircraft with the electric taxi drive systems from the parallel to a nose-out orientation to taxi with the electric taxi drive systems out of the ramp. Markings on the ramp ground surface indicate the maneuvering path of the aircraft 40 as it maneuvers nose-in with the electric taxi drive systems toward a parallel parking location (FIG. 4A), turns to park in the parallel parking orientation (FIG. 4B), a first fully extended passenger loading bridge is aligned with and connected to an aircraft rear door, and then a second passenger loading bridge, initially only partially extended, is fully extended and connected to the aircraft front door for passenger transfer (FIG. 4C). Following passenger transfer, the passenger loading bridges are disconnected from the aircraft and retracted away from the aircraft, and the aircraft is turned with the electric taxi systems to a nose-out orientation (FIG. 4D). The aircraft is driven away from the parking location and out of the ramp area (FIG. 4E).

It will be noted that the arrangement of passenger loading bridges 42 and 44 in FIGS. 4A-4F differs from that shown in FIGS. 1 and 2. In this arrangement, the two passenger loading bridges may connect to a terminal building, represented at 46, through a single connection. When the passenger loading bridge 42 can be lowered to a height below that of the aircraft wings 48, loading bridge 42 can be pre-positioned quite close to the aircraft and the electric taxi drive systems may safely maneuver the aircraft 40 through the turn shown in FIG. 4B so that the passenger loading bridge 42 substantially aligns with the aircraft rear door. Only minor adjustment should be needed to fully connect the passenger loading bridge 42 to the aircraft rear door. The passenger loading bridge 44 may be extended at an angle, as shown in FIG. 4C, to connect with the aircraft front door. It is anticipated that the passenger loading bridge 44 may be extended farther and pre-positioned closer to the aircraft 40 than shown in FIG. 4B. The extent to which both passenger loading bridges 42 and 44 may be pre-positioned so that both may be connected to the aircraft with minimal or minor adjustment may depend on the type of aircraft and the specific arrangement of loading bridges and their connections to the terminal.

Figure 4F:
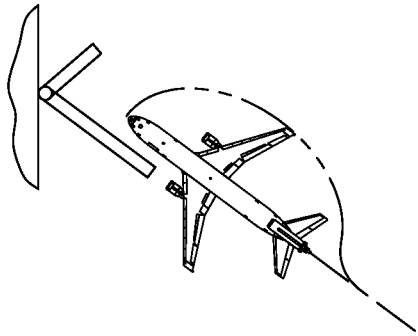
Figure 4F:
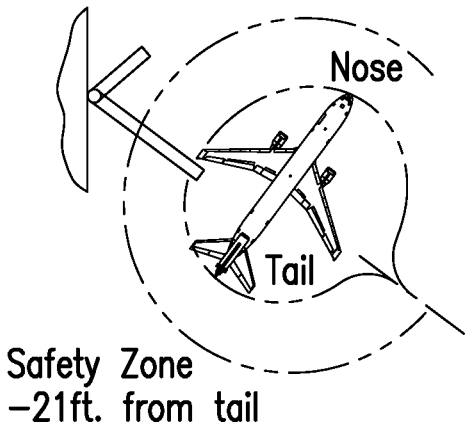
Figure 4F:
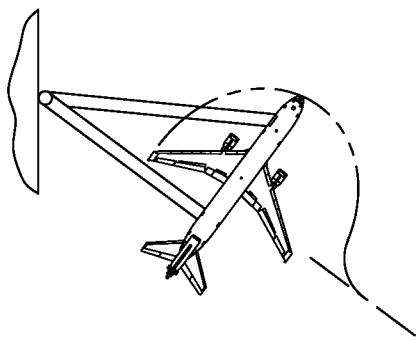
Figure 4F:
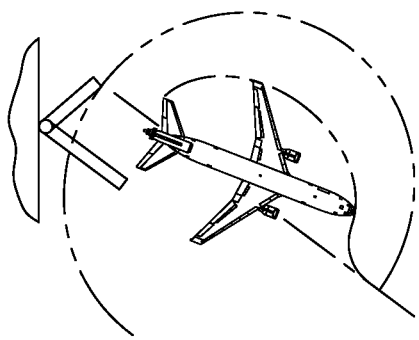
Figure 4F:
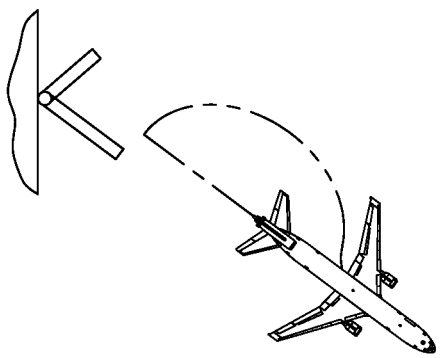

FIG. 4F labels the steps of the method shown and described in connection with FIGS. 4A-4E and shows more details of the aircraft's maneuvers with the electric taxi drive systems. FIG. 4A shows the aircraft 40 taxiing into the ramp parking location, and FIG. 4B shows the aircraft 40 being maneuvered with the electric taxi systems to turn in a specific maneuver referred to as the Twist In, in which the aircraft 40 is turned about 90 degrees from the taxi in position. In FIG. 4C, both passenger loading bridges 42 and 44 are connected, respectively, to a rear door and to a front door of the aircraft 40, and passenger transfer, during which arriving passengers deboard and departing passengers board, occurs. Upon completion of passenger transfer, the electric taxi drive systems maneuver the aircraft to turn 90 degrees in a maneuver referred to as the Twist Out, shown in FIG. 4D. When the aircraft 40 has been maneuvered to a nose-out position, the electric taxi drive systems drive the aircraft to taxi out of the ramp area.

As noted, different types of aircraft may have different spacing between doors to be connected to passenger loading bridges. The present method may include obtaining and storing this information for the different types of aircraft that may be assigned to a stand or parking location and communicating it to an automated or other system that operates the passenger loading bridges at that location. A passenger loading bridge operating system suitable for this purpose may be programmed to receive information relating to aircraft type and door spacing for the aircraft assigned to be parked in the parallel orientation at the stand. Signals from an electric taxi drive system-driven aircraft within the ramp and approaching the stand may be sent to the passenger loading bridge operating system identifying the type of aircraft and one or more passenger loading bridges may be automatically or manually extended to a pre-positioned location that will substantially align the aircraft connection end of the loading bridge with a corresponding aircraft door. FIGS. 1A, 1B, and 2 illustrate one arrangement of pre-positioned passenger loading bridges; FIGS. 4A-4-F illustrates another arrangement. Adjustment and connection of the pre-positioned passenger loading bridges to the aircraft may be assisted by sensors positioned on the passenger loading bridge aircraft connection end, on the aircraft, or on both. A system for pre-positioning passenger loading bridges to substantially align with aircraft door locations and then adjusting height and other parameters of the substantially aligned passenger loading bridges to fully align them to be connected with aircraft doors may be guided by artificial intelligence to operate automatically. Variations of the foregoing pre-positioning method are further contemplated to be within the scope of the present invention.

The present method for reducing time required for maneuvering and parking aircraft in a parallel orientation at an airport terminal has been described in connection with pre-positioning two extendible passenger loading bridges that are connected to aircraft rear and front doors for passenger transfer. Some types of aircraft have multiple front and rear doors that may be connected to multiple passenger loading bridges and used for passenger transfer. These types of aircraft may be equipped with electric taxi drive systems to power ground travel and to maneuver the aircraft into parallel parking orientations at airports with stands with multiple extendible passenger loading bridges. Two or more of the multiple passenger loading bridges may be pre-positioned in locations that may substantially align with two or more aircraft front and rear doors and facilitate connections between the pre-positioned passenger loading bridges and the doors when the aircraft is maneuvered with the electric taxi drive systems into a stand. It is anticipated that the present method may be adapted to pre-position any number of passenger loading bridges at an airport stand so that they are in substantial alignment with corresponding aircraft front and rear doors and may be connected to the doors with minor or minimal adjustment to dock aircraft in parallel parking orientations.

While the present invention has been described with respect to preferred embodiments, this is not intended to be limiting, and other arrangements and structures that perform the required functions are contemplated to be within the scope of the present invention.

INDUSTRIAL APPLICABILITY

The method of the present invention will have its primary applicability where it is desired to facilitate and minimize time for connection of electric taxi drive system-driven aircraft to passenger loading bridges and docking the aircraft at a parking location when aircraft are maneuvered with the electric taxi drive systems into parallel parking orientations at airport terminal stands for passenger transfer.

The invention claimed is:

1. A method that reduces time required to maneuver and dock an electric taxi drive system-driven aircraft in a parallel parking orientation at an airport terminal parking location, comprising:
   a. providing an aircraft equipped with and driven by electric taxi drive systems to maneuver into and out of parallel parking locations at stands at an airport terminal;
   b. providing parallel parking locations at the airport terminal with at least two extendible passenger loading bridges at each parallel parking location, each extendible passenger loading bridge having a terminal connection end attached to the airport terminal and an aircraft connection end connectable to a front door or a rear door on a terminal-facing side of the equipped aircraft and being extendible a connection distance from the airport terminal to substantially align and connect the aircraft connection end of each passenger loading bridge with the front or the rear aircraft door;
   c. assigning an equipped aircraft driven by electric taxi drive systems to park in an orientation with a longest axis of the equipped aircraft parallel to the airport terminal at an assigned parallel parking location and;
   d. extending two of the at least two extendible passenger loading bridges at the assigned parallel parking location laterally outwardly of the airport terminal all or at least a portion of the connection distance and pre-positioning the aircraft connection ends of the two extendible passenger loading bridges in locations that substantially align with a forward door and a rear door on the equipped aircraft when the equipped aircraft is parked in the parallel orientation;
   e. driving the equipped aircraft with the electric taxi drive systems to the assigned parallel parking location and maneuvering the equipped aircraft with the electric taxi drive systems to park in the parallel orientation with the aircraft forward and rear doors substantially aligned with the locations of the pre-positioned aircraft connection ends on each passenger loading bridge; and
   f. adjusting each passenger loading bridge as required to fully align the aircraft connection end of one passenger loading bridge with a corresponding aircraft front door and the aircraft connection end of the other passenger loading bridge with a corresponding aircraft rear door, connecting the aircraft connection ends to the corresponding forward and rear doors, and establishing passenger transfer connections between the equipped aircraft and the airport terminal through the connected two extended passenger loading bridges.

2. The method of claim 1, further comprising determining a distance between the forward door and the rear door to be connected to the aircraft connection ends of the two passenger loading bridges for the equipped aircraft assigned to park in the parallel orientation at the parking location, laterally extending and pre-positioning the two passenger loading bridges with the aircraft connection ends spaced apart the determined distance and enabling substantial alignment with and connection to the forward door and the rear door with minimal adjustment after the equipped aircraft is maneuvered into the parallel parking orientation with the electric taxi drive systems.

3. The method of claim 2, further comprising pre-positioning the two passenger loading bridges to extend laterally perpendicular to the airport terminal and parallel to each other.

4. The method of claim 1, further comprising providing two passenger loading bridges at the assigned parking location, one of the passenger loading bridges to be connected to the rear door, laterally extending and pre-positioning the one passenger loading bridge at a height above a ramp ground surface that is above or below a height of a horizontal stabilizer on a tail of the equipped aircraft and in substantial alignment with the rear door, maneuvering the equipped aircraft with the electric taxi drive systems into the parallel parking orientation to substantially align the rear door with the pre-positioned one passenger loading bridge, vertically adjusting the pre-positioned one passenger loading bridge to fully align with the rear door, and connecting the one passenger loading bridge aircraft connection end to the rear door to establish the passenger transfer connection.

5. The method of claim 4, further comprising laterally extending and pre-positioning a second of the two passenger loading bridges to substantially align with and be connected to the forward door a different height above the ground than the one passenger loading bridge and adjusting the pre-positioned second passenger loading bridge as required to connect the second passenger loading bridge aircraft connection end to the forward door and establish the passenger transfer connection.

6. The method of claim 5, further comprising maneuvering the equipped aircraft with the electric taxi drive systems from a nose-in ground travel orientation to the parallel parking orientation at the assigned parallel parking location and avoiding contact between the aircraft horizontal stabilizer and the pre-positioned one passenger loading bridge prior to full alignment and adjustment of the one passenger loading bridge to establish the passenger transfer connection.

7. The method of claim 4, further comprising laterally extending and pre-positioning the one passenger loading bridge at a height above the ramp ground surface that is below a height of a wing of the aircraft and in substantial alignment with the rear door.

8. The method of claim 7, further comprising maneuvering the equipped aircraft with the electric taxi drive systems from a nose-in ground travel orientation to the parallel parking orientation at the assigned parallel parking location and avoiding contact between the aircraft wing and the pre-positioned one passenger loading bridge prior to full alignment and adjustment of the one passenger loading bridge to establish the passenger transfer connection.

9. The method of claim 1, further comprising providing more than two extendible passenger loading bridges at the parking location laterally extendible to substantially align with and connect to a corresponding number of aircraft forward and rear doors on the equipped aircraft terminal-facing side and pre-positioning the aircraft connection ends of each of the more than two extendible passenger loading bridges in locations that substantially align with a corresponding forward or rear door, maneuvering the equipped aircraft with the electric taxi drive systems into the parallel orientation, and fully aligning each pre-positioned passenger loading bridges with the corresponding forward or rear door.

10. The method of claim 1, further comprising identifying a type of equipped aircraft assigned to the parking location, determining a spacing distance corresponding to a spacing between the forward door and the rear door to be connected to the two extended passenger loading bridges, determining the distance to substantially align the two extended passenger loading bridges with the forward and rear doors, and pre-positioning the two passenger loading bridges to extend the distance determined for substantial alignment with the forward and rear doors and the aircraft connection ends separated by the spaced distance.

11. The method of claim 1, further comprising driving the equipped aircraft with the electric taxi drive systems within the ramp area to approach the parking location from a right direction or a left direction relative to the assigned parking location and maneuvering the equipped aircraft into the parallel orientation with the electric taxi drive systems to substantially align the forward and rear doors on a starboard side of the aircraft or the forward and rear doors on a port side of the aircraft with the extended passenger loading bridges.

12. A method for reducing time required to maneuver an electric taxi drive system-driven aircraft into an airport terminal parking location in a nose-in orientation to park in a parallel orientation and establish a passenger transfer connection, comprising, a. providing an aircraft equipped with and driven by electric taxi drive systems to maneuver into and out of parallel parking locations at stands at an airport terminal;

b. providing two extendible passenger loading bridges at each parallel parking location at the airport terminal, each extendible passenger loading bridge having a terminal connection end attached to a single connection location at the airport terminal and an aircraft connection end connectable to a front door or a rear door on a terminal-facing side of the equipped aircraft, one of said extendible passenger loading bridges being extendible a connection distance from the single connection location to align with and connect the aircraft connection end to the rear door behind a wing of said equipped aircraft and the other passenger loading bridge being extendible a connection distance from the single connection location to align with and connect the aircraft connection end to the front door, and extending the one extendible passenger loading bridge the connection distance and pre-positioning the aircraft connection end at a location to substantially align with the rear door;

c. driving the equipped aircraft with the electric taxi drive systems in a nose-in orientation into a parallel parking location, turning and parking the aircraft in a parallel orientation, and substantially aligning rear door with the aircraft connection end of the extended one extendible passenger loading bridge;

d. extending the other extendible passenger loading bridge the connection distance from the single connection location and substantially aligning the aircraft connection end with the parked aircraft front door;

e. adjusting the one and the other passenger loading bridge as required and fully aligning the aircraft connection end of the one passenger loading bridge with the rear door and the aircraft connection end of the other passenger loading bridge with the front door, connecting the one and the other passenger loading bridges aircraft connection ends to the respective rear and forward doors, establishing passenger transfer connections between the parked equipped aircraft and the airport terminal through the connected passenger loading bridges, and transferring passengers between the parked equipped aircraft and the airport terminal; and f. when passenger transfer is complete, turning the equipped aircraft with the electric taxi drive systems to a nose-out orientation and driving the equipped aircraft out of the parallel parking location with the electric taxi drive systems.

13. The method of claim 1, further comprising determining an optimal connection distance for extension of the two passenger loading bridges for a type of aircraft equipped with the electric taxi systems, laterally extending the two passenger loading bridges outwardly of the airport terminal for the optimal connection distance that locates the aircraft connection end of each passenger loading bridge at a pre-positioned location that substantially aligns with a location of a forward or a rear aircraft door on the type of aircraft, maneuvering the equipped type of aircraft close to the passenger loading bridges aircraft connection ends, and fully aligning the aircraft connection ends and the forward or rear doors with minimal adjustment to establish the passenger transfer connections.

14. The method of claim 13, further comprising laterally extending the two passenger loading bridges for the optimal connection distance and maneuvering the equipped type of aircraft so that full alignment between a passenger loading bridge aircraft connection end and an aircraft forward or rear door requires only vertical adjustments.

15. The method of claim 1, further comprising laterally extending and pre-positioning a passenger loading bridge to be connected to a rear door of the equipped aircraft at a height above a ramp surface lower than a height of a wing of the equipped aircraft and maneuvering the equipped aircraft with the electric taxi drive systems so that the aircraft connection end is substantially and then fully aligned with the rear door without contact between the aircraft wing and the passenger loading bridge.

* * * * *